H. STEWART.
COUPLING.
APPLICATION FILED DEC. 14, 1911.

1,044,590.

Patented Nov. 19, 1912.

WITNESSES
F. C. Fliedner
N. B. Keating

INVENTOR
Harland Stewart
BY
F. M. Wright,
ATTORNEY

UNITED STATES PATENT OFFICE.

HARLAND STEWART, OF SAN FRANCISCO, CALIFORNIA.

COUPLING.

1,044,590.
Specification of Letters Patent. Patented Nov. 19, 1912.
Application filed December 14, 1911. Serial No. 665,715.

*To all whom it may concern:*

Be it known that I, HARLAND STEWART, a citizen of the United States, residing at San Francisco, in the county of San Francisco and State of California, have invented new and useful Improvements in Couplings, of which the following is a specification.

The present invention relates to couplings such as are used for connecting the ends of chains, or for securing check-reins or like devices.

The object of the invention is to provide a coupling which will be neat and attractive in appearance, and can be readily coupled and uncoupled.

Figure 1:
Figure 2:
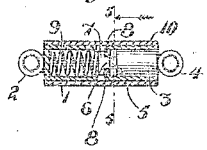
Figure 4:
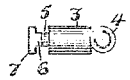
Figure 3:
Figure 5:
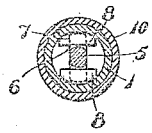
Figure 6:
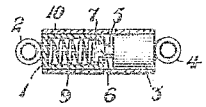
Figure 7:
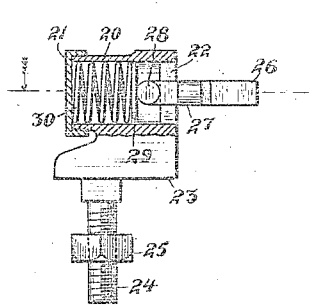
Figure 8:
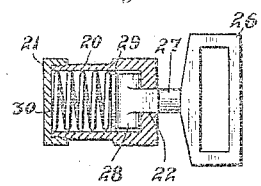

In the accompanying drawing, Figure 1 is a side view of the coupling, shown as used to join the ends of a chain or chains; Fig. 2 is a longitudinal sectional view of the same on an enlarged scale; Fig. 3 is a side view of the same, the outer casing being removed; Fig. 4 is a side view of one portion of the coupling detached; Fig. 5 is a cross section on the line 5—5 of Fig. 2 on a greatly enlarged scale; Fig. 6 is a longitudinal section, partly in side elevation, of a modification of the invention; Fig. 7 is a longitudinal vertical section, partly in side elevation, of the coupling as used for a check rein holder; Fig. 8 is a longitudinal horizontal section of the same partly in plan view.

Referring to Figs. 1 to 5 of the drawing, 1 indicates a tubular coupling member closed at one end, and open at the other. Secured to the closed end of said tube 1 is a loop 2, by which it may be connected to a chain or other device to be secured. Slidable through the open end of said tube 1 is a cylindrical body of a coupling member 3 having a similar loop 4 secured to its outer end. From the inner end of said cylindrical body extends axially a stem 5, which at the part next adjacent to said body is also cylindrical but of greatly reduced diameter. At a part more remote from said body it is square in cross section. Said stem terminates in a head 7 extending in two opposite directions transversely to the stem.

At about the center of the tube 1, diametrically opposite to one another, lips 8 are formed by cutting them from the middle of the tube, each along three sides of the lip, and then bending them inwardly from the tube along the fourth side. The inner edges of said lips thus form a retainer for retaining said head within the tube 1 when passed between said lips. A coiled spring 9 is compressed between said head and the closed end of the tube 1 and presses said head against said lips. When the coupling member is withdrawn the lips serve to retain the coiled spring within the tube 1.

To unite the two coupling members, the coupling member 3 is inserted within the tube 1 so that the transversely extending portions of the head will be parallel with the inner edges of the lips, and so that said head can pass between said lips. To assist in turning the member 3 so that the head may be in this position, the loops 2 and 4 are arranged so that they will then be in planes at right angles to one another. The head when passing between the lips compresses the coiled spring, and, when it has passed entirely behind said lips, it is turned at right angles, and is then held very securely in place, being pressed against said lips by said coiled spring. For the better grades of jewelry it is preferable to provide an outer tube 10 surrounding the inner tube 1 and concealing the openings 11, clearly shown in Fig. 3, which are left in the inner tube, by the formation of the lips. In the form of the invention shown in Fig. 6 said lips are pressed inwardly from the inner tube at its open end instead of from a mediate portion thereof, and the outer tube 10 extends a considerable distance beyond said end of the inner tube to form a guide for the cylindrical body of the other coupling member which is then formed of a diameter to fit snugly within the outer tube 10.

Figs. 7 and 8 illustrate the invention as applied to a check rein holder. In this form of the invention a tube 20, corresponding to the tube 1 in the first-described forms of the invention, is at one end closed by a screw cap 21 and at the other end closed except for a vertical diametral slot 22. Said tube has a downward extension 23 terminating in a bolt 24 having a nut 25 by which it may be held in position. A loop 26, through which the check rein or other device can be passed, has a stem 27, the part of which next adjacent to said loop is cylindrical and the part of which more remote therefrom is square in cross section, said stem terminating in a transversely extending head 28, preferably cylindrical. The width of the square portion of the stem is just less than the width of the slot 22 in the end of the tube 20, so that said square portion can pass through, but not turn in, said slot. When said head is inserted through said slot it abuts against a follower 29 pressed by one end of a coiled spring 30, the other end of which is pressed against the screw cap 21. To connect the parts of the coupling, the stem having been placed so that the head extends parallel with the slot, the head and stem are passed through the slot until the square portion of the stem has passed entirely therethrough and the cylindrical portion only of said stem is contained in said slot. Said stem is then turned so that the head extends transversely to the slot. On pressure being removed from the stem, the square portion of the stem returns within the slot. In this position the loop can swing vertically, the square portion of the stem moving in the slot. It cannot, however, be turned about the axis of the stem and therefore cannot be uncoupled unless the stem is again first pressed inwardly, so that its cylindrical portion only is contained within the slot.

It will be observed that the construction embodied in all the forms of my invention here disclosed is that in which one coupling member has a transversely extending head, and a stem of which a portion next said head is square in cross section and a portion more remote therefrom is cylindrical, and the other coupling member has a cylindrical chamber for a coiled spring and a retaining means for the head, said retaining means being formed with an elongated opening of sufficient width and length to permit the head to pass therethrough and of width sufficient to permit the cylindrical portion of the stem to turn therein, but insufficient to permit the square portion thereof to so turn.

I am aware that in Letters Patent No. 942,330 of 1910 to W. M. Jones and myself, a coupling is disclosed somewhat similar in general construction to that now claimed, but, in the device of said patent, the stem was cylindrical throughout its entire length. Consequently it was necessary to provide recesses in the front end of the body of the casing to receive the terminal portions of the cross member and prevent the stem from turning about its axis. The formation of these recesses was a troublesome and expensive operation. By forming the stem with the part nearest the other member of the coupling square in cross section and of sufficient width to slide through the slot in the end of the other coupling member, but not to turn therein, the necessity of forming these recesses is avoided.

I claim:—

A coupling comprising a coupling member having a stem, one portion of which is cylindrical and another portion of which is square in cross section, said stem being provided at the end adjacent to said latter portion with an elongated transversely extending head, and at the other end with means for connecting it with an element to be coupled, and a second coupling member formed with a cylindrical chamber for a coiled spring and with a slotted head having an inner plane surface, and a coiled spring within said chamber, said slot being of sufficient length to permit said head to pass therethrough, and of sufficient width to permit the cylindrical portion of the stem to turn therein and the square portion of the stem to pass therethrough but insufficient to permit said square portion to so turn.

In testimony whereof I have hereunto set my hand in the presence of two subscribing witnesses.

HARLAND STEWART.

Witnesses:
  F. M. WRIGHT,
  D. B. RICHARDS.